United States Patent

Dickinson et al.

[15] 3,636,425

[45] Jan. 18, 1972

[54] SHAFT-POSITIONING MECHANISM

[72] Inventors: George R. Dickinson, Norridge; Scott N. Moritz, Villa Park; Werner H. Puls, Northbrook, all of Ill.

[73] Assignee: Zenith Radio Corporation, Chicago, Ill.

[22] Filed: Dec. 2, 1970

[21] Appl. No.: 94,356

[52] U.S. Cl. ....................318/467, 318/207, 334/52

[51] Int. Cl. ....................G05b 11/01

[58] Field of Search..........318/207 R, 227, 467; 334/52; 188/69

[56] References Cited

UNITED STATES PATENTS

| | | | |
|---|---|---|---|
| 3,388,308 | 6/1968 | Fontaine | 318/467 |
| 3,444,448 | 5/1969 | Welch | 318/207 |
| 3,496,438 | 2/1970 | Kull | 318/467 X |
| 3,579,064 | 5/1971 | Taylor | 318/207 |

*Primary Examiner*—Benjamin Dobeck
*Attorney*—Francis W. Crotty and Cornelius J. O'Connor

[57] ABSTRACT

A drive mechanism for displacing a control shaft to a preset position employs a bidirectional electric motor which is energizable through a pair of independent switches that connect the motor windings to an energizing source. A motor actuator includes a pair of spaced-apart conductive members supported for rotation with the shaft and individually connected to an assigned one of the switches. The actuator also includes a contactor having a span greater than the spacing between the conductive members and locatable to a point related to a desired preset shaft position. The contact is displaceable from a standby to an index or operating position where it engages one of the conductive members to activate a motor-energizing switch and thereby initiate displacement of the shaft toward the preset position. The activated switch is subsequently deactivated when both the conductive members simultaneously engage the contact upon their arrival at the point related to the preset position.

6 Claims, 10 Drawing Figures

Inventors
George R. Dickinson
Scott N. Moritz
Werner H. Puls
By Cornelius J. O'Connor
Attorney Inventors
George R. Dickinson
Scott N. Moritz
Werner H. Puls
By Cornelius J. O'Connor Atty.

SHAFT-POSITIONING MECHANISM

BACKGROUND OF THE INVENTION

This invention relates in general to apparatus for displacing a shaft and, in particular, to a mechanism for accurately locating a control shaft to a predetermined position.

Apparatus for accurately locating a control shaft finds particular application in continuously tunable radio and television tuners. For example, a widely employed UHF television tuner today is a capacity tuned instrument continuously tunable across the UHF band through a 180° rotation of the control shaft. Thus, in this type of tuner, a shaft rotation of one degree is equivalent to 2.3 mHz. More significantly, it should be noted that reception of a color transmission requires that the local oscillator of the tuner be tunable within ±150 kHz. of an assigned transmitter frequency. This 300 kHz. band translates, in terms of angular displacement, into 8 minutes of shaft rotation. While resort to AFC circuitry mitigate, to some extent, the severity of the shaft-positioning accuracy requirement, it is quite obvious that achieving an acceptable degree of repeat accuracy, i.e., the ability to consistently return the control shaft to a predetermined position, is no mean task.

In the matter of electromechanical station preselection for continuous tuner devices, the prior art has resorted to a multitude of arrangements involving solenoids, stepping relays, ratchets, electric motors, etc. An obvious shortcoming of solenoids, relays and ratchets resides in the fact that such arrangements are committed to incremental displacements corresponding to the spacing of the gear teeth or other structure cooperating with a ratchet pawl.

Finally, insofar as prior art motor and drive gear arrangements are concerned, in addition to the requisite indexing mechanism, ancillary structure and circuitry must be employed in order to compensate for the effects of motor inertia, overrun, hunting, etc. This has resulted in complex necessarily expensive structures, the shortcomings of which are obvious.

SUMMARY OF THE INVENTION

It is therefore a general object of the invention to provide a drive mechanism for accurately locating a control shaft to a predetermined position.

It is a specific object of the invention to provide a UHF tuner drive mechanism for precisely positioning, repeatably, the control shaft to a predetermined position.

It is a particular object of the invention to provide a drive mechanism for displacing a control shaft, in a selectable direction, to a desired predetermined tuning position.

It is a specific object of the invention to provide a presettable bidirectional electric drive mechanism for a UHF tuner.

A drive mechanism, constructed in accordance with the invention, for displacing a control shaft to a predetermined position comprises a bidirectional electric motor coupled to the shaft and having first and second windings which are energizable for driving the motor in either a clockwise or counterclockwise direction. The mechanism includes a source of energization for the windings and a pair of switches for independently connecting assigned ones of the windings directly to the energizing source. Means are provided which include an actuator for selectively activating the switches. The actuator comprises a pair of spaced-apart conductive members which are supported for conjoint displacement with the shaft and are individually connected to assigned ones of the switches. The actuator further includes a contactor which has a span greater than the spacing between the conductive members and which is locatable to a point related to the desired predetermined shaft position. The contactor is supported in a confronting relation to the conductive members and, when displaced from a standby position to an index position, is engageable with one of the conductive members to activate one of the motor-energizing switches to initiate displacement of the shaft toward the predetermined position. The activated switch is thereafter deactivated when both of the conductive members simultaneously engage the contactor upon their arrival at the point related to the predetermined position.

BRIEF DESCRIPTION OF THE DRAWINGS

The features of the present invention which are believed to be novel are set forth with particularity in the appended claims. The invention, together with further objects and advantages thereof, may best be understood, however, by reference numerals identifying like elements, and in which:

DESCRIPTION OF THE ILLUSTRATED EMBODIMENT

Figures 1, 1A, 2, 2A:
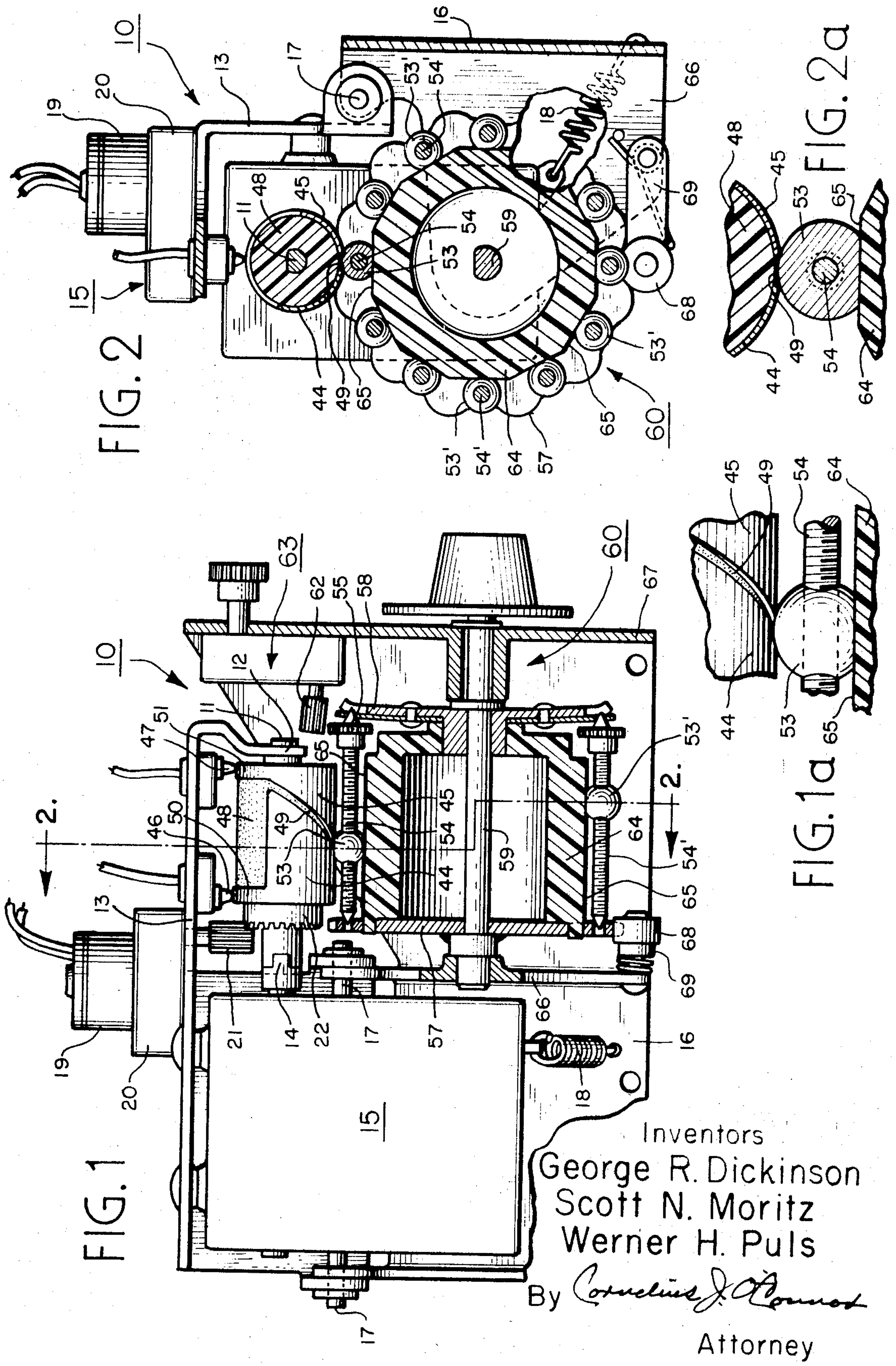
FIG. 1 is a side elevation view, partly in section, of a drive mechanism, constructed in accordance with the invention, for controlling a television tuner.
FIG. 1*a* is an enlarged representation of the indexed contactor ball as shown in FIG. 1.
FIG. 2 is a front elevation view, partly in cross section, taken along lines 2—2 of FIG. 1.
FIG. 2*a* is an enlarged representation of the indexed contactor ball as viewed in FIG. 2.

The drive mechanism 10 of FIG. 1, as employed in the disclosed embodiment of the invention, serves to rotate a control shaft 11 to a desired predetermined position. One end of shaft 11 is rotatably supported by a bracket 12 extending from a mounting plate 13 while the other end is connected via a coupling 14 to a continuously adjustable type radiofrequency tuner 15 which is also mounted on plate 13. For purposes soon to be made clear, plate 13 is pivotally mounted upon a chassis base 16 by a pin 17 and biased in a counterclockwise direction, as viewed in FIG. 2, by a spring 18 anchored to base 16. Tuner 15 can be a VHF tuner, a UHF tuner or a combination VHF-UHF tuner. Insofar as the disclosed embodiment is concerned, and only for purposes of illustration, device 15 is assumed to be a UHF tuner continuously tunable across the UHF band upon a 180° rotation of control shaft 11. It should be understood from the onset that drive mechanism 10 is not restricted for use with a tuner control shaft, per se, but can be employed with equal facility for precisely positioning the control shaft of a potentiometer, such as the type employed for deriving control voltages for a varactor-type tuner. Furthermore, it is recognized that drive mechanism 10 can be utilized in other applications requiring precise positioning of a control shaft, e.g., orienting the support for a rotatable antenna, etc.

In any event, drive mechanism 10 comprises a bidirectional motor 19 which is coupled through a gear train 20 and a drive gear 21 to a pinion 22 affixed to control shaft 11. Motor 19 and gear train 20 are mounted upon plate 13 in such a manner that gear 21 is permanently meshed with pinion 22.

Figure 3:
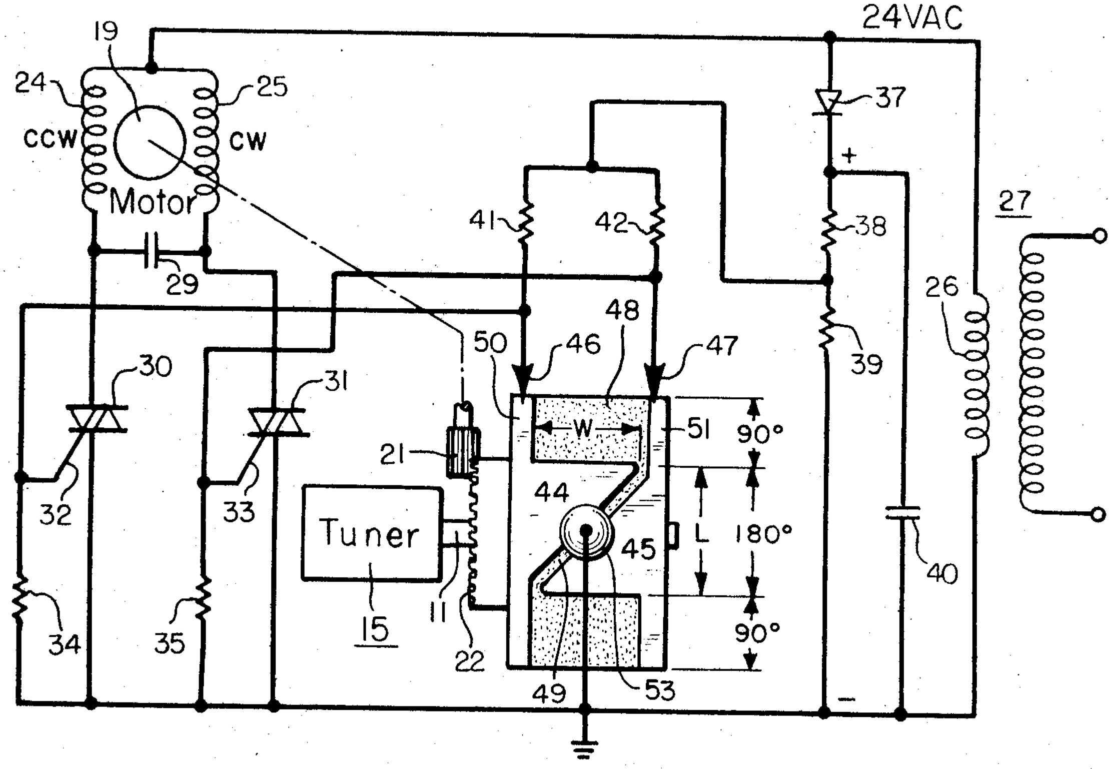
FIG. 3 is a schematic diagram of an energizing circuit for the drive mechanism shown in FIG. 1.

The motor has a pair of windings 24, 25, see FIG. 3, which are selectively energizable for driving the motor in counterclockwise and clockwise directions, respectively. One end of each of windings 24, 25 is returned to a source of energization, the high-voltage terminal of the secondary winding 26 of a stepdown transformer 27. A capacitor 29 is coupled between the other extremities of windings 24, 25 to provide the requisite phase shift for operating the motor. A pair of normally nonconducting switches comprising the triac devices 30, 31 independently connect the low-potential terminals of windings 24, 25 respectively, to the low-potential terminal of transformer secondary 26. The respective control or gate terminals 32, 33 of triacs 30, 31 are returned to reference potential through the resistors 34, 35 and also to a source of control signal derived from energizing source 27. Absent a control voltage on their gate terminals, the triac switches remain open, that is, nonconducting.

Drive mechanism 10 further comprises means including an actuator for selectively activating triacs 30, 31 to permit application of energizing potential from transformer winding 26 across motor windings 24, 25. To this end the aforementioned means comprises, as a source of control signal, a half-wave rectifier device 37 and a pair of resistors 38, 39 arranged in series across the terminals of transformer secondary 26. A filter capacitor 40 is shunted across resistors 38, 39 while the junction of these resistors is connected via a pair of current-limiting resistor 41, 42 to the triac gate terminals 32, 33, respectively.

The actuator adverted to above as being included in the means for selectively activating the triac switches comprises a pair of spaced-apart conductive members 44, 45 which are supported for conjoint displacement with control shaft 11 and are individually connected to triac gate terminals 32, 33, respectively, via wiping contacts 46, 47 affixed to and depending from mounting plate 13. Conductors 44, 45 are preferably formed from cylindrical portions of conductive material which, when uncoiled and arranged in planar form, have the configuration shown in FIG. 3. In practice, members 44, 45 are mounted upon a drum 48 of insulating material which is fixed to control shaft 11 for rotation therewith so that members 44, 45 effectively constitute a pair of rotatable switching contacts. Each of conductors 44, 45 comprise a tapered section arranged in a confronting spaced-apart relation to the other so as to establish a nonconductive gap 49 between the conductors. Additionally, conductors 44, 45 include respective annular contact areas 50, 51 which are arranged upon drum 48 to effect a continuous engagement with wiping contacts 46, 47. Insofar as their switching role is concerned, the effective working surfaces of conductors 44, 45 are those portions of the conductors exclusive of their annular contact areas 50, 51.

As shown in FIG. 3, gap 49 is oriented approximately 45° relative to the axis of control shaft 11. The slope of this gap is determined by the length (L) and width (W) of the working surfaces of the conductors. Suffice it to say at this juncture, that, for a most efficient use of conductor working surface and utilization of space, the L and W dimensions of the conductors should be approximately equal.

With conductors 44, 45 arranged upon drum 48, gap 49 traverses an angular distance of approximately 180°. In the disclosed embodiment, control shaft 11 has been designated as having a travel of 180°; in practice, however, a small "guard band" is provided to insure control over the entire 180° of shaft rotation. The extent of the "guard band" is such as to effectively extend the angular distance of the gap 10 to 20 depending upon the safety factor desired.

The actuator for activating the triac switches further comprises a laterally adjustable contactor ball 53 which has a span greater than the gap 49 between conductors 44, 45 and which is locatable to a point related to a desired preset position for shaft 11. As shown in the schematic diagram of FIG. 3, contactor 53 is maintained at a plane of reference potential or ground, actually chassis 16, by the apparatus now to be described. Referring to FIGS. 1*a* and 2*a*, contactor 53 is seen to comprise a centrally bored ball of conductive material which is in conductive engagement with both of conductors 44, 45 when spanning gap 49. For a purpose soon to be made clear, contactor 53 also comprises a planar surface portion. The bore is threaded to accommodate a spindle 54 having a pinion 55 fitted to one end. The spindle is rotatably supported by a pair of panels 57, 58 which are secured to the control shaft 59 of a turret 60. Panel 58 is constructed in the form of a spider having a multitude of resilient fingers individually engageable with the pinion ends of the spindles. Mounted in this fashion spindle pinion 55 is presentable to the drive gear 62 of a preset mechanism 63 and, when it is so located, is said to occupy the index position of the turret. In order to avoid cluttering the drawings the mechanical details of the preset mechanism are not disclosed. Desirable, mechanism 63 adopts the structure of the fine tuning arrangement described in U.S. Pat. No. 3,058,075 which issued to E. J. Polley on Oct. 9, 1962.

Actually, turret 60 comprises a programmer for control shaft 11 in that panels 57, 58 support, in addition to spindle 54, a plurality of spindles 54′ each having a ball contact 53′. As best seen in FIGS. 1 and 2, the turret includes a core 64 of insulating material, mounted upon turret shaft 59, and having a plurality of flats 65 formed on the outer surface thereof for cooperating with the ball contactors. Specifically, contactors 53, 53′ are arranged so that the planar portion of each engages the immediately adjacent flat 65 of core 64. In this manner when a spindle is rotated by preset mechanism 63, the associated ball contactor is subjected to a displacement parallel to the axis of its spindle.

Finally, turret shaft 59 is rotatably journaled upon a pair of brackets 66, 67 extending from chassis base 16 so that the ball contactors, and their associated spindles and pinions, are sequentially positionable from standby positions to the index or operating position. To facilitate indexing a selected ball contactor, the periphery of panel 57 is scalloped to provide an undulating cam surface engageable with a detent roller 68 carried by a spring-loaded detent lever 69 pivotally mounted upon bracket 66. It is now apparent that one or more conductive paths for establishing the aforementioned ground connection between contactor ball 53 and chassis 16 are effected through spindle 54, turret panels 57, 58, turret shaft 49, detent mechanism 58, 59 and brackets 66, 67.

OPERATION OF THE ILLUSTRATED EMBODIMENT

Insofar as the operation of drive mechanism 10 is concerned, it is the duty of turret 60 to select a particular one of contactors 53, 53′ and transport it from its standby position to the index position. It is then the function of the selected contactor to effect energization of motor windings 24, 25 to displace control shaft 11 to a predetermined position. Before proceeding further, however, it would be helpful to refer again to FIG. 2 in order to understand the reason for pivotally mounting plate 13 and spring biasing it in a counterclockwise direction. The purpose of spring 18 is to releasably urge one or both of conductors 44, 45 into a positive conductive connection with the indexed contactor ball 53. Accordingly, with this arrangement, as the turret is rotated to select a particular contactor ball, conductors 44, 45 as well as the rest of the apparatus mounted on plate 13, are pivoted about pin 17 by the contactor balls as they pass through the index position until the desired contactor is transported to the index position for engagement with conductors 44, 45.

Initially, consideration will be given to the condition that obtains for the motor-energizing circuit when contactor 53 is positioned as shown in FIGS. 1 and 2 and detailed in FIGS. 1*a* and 2*a*, that is, in simultaneous engagement with conductors 44, 45. In operation transformer 27 serves to develop, for the apparatus herein utilized, approximately 24 volts AC across secondary winding 26 which potential is applied across the motor windings and their triac switch circuits, as well as across rectifier circuits 37–40. In conventional fashion a positive DC control voltage is developed at the juncture of resistors 38, 39 and made available, via current-limiting resistors 41, 42, to triac gate electrodes 32, 33. However, since the junctures of resistors 41, 42 and their respective gate electrodes are also connected to conductors 44, 45 through wiping contacts 46, 47 and, since contactor ball 43 is spanning conductors 44, 45, both gate electrodes 32, 33 are maintained at ground potential. In this circumstance, i.e., with the control voltage from resistors 41, 42 shorted to ground, triac switches 30, 31 remain open, i.e., nonconductive, and withhold energizing potential from motor windings 24, 25.

Attention is now directed to the manner in which turret 60 is programmed, as well as to its mode of operation. Referring back to FIG. 1, in order to program contactor 53 so that each time it is rotated to the index position it conditions tuner 15 for operation at a particular UHF station, recourse is had to preset mechanism 63. Assume for purposes of illustration that it is desired to assign UHF channel 14 to contactor 53 so that the contactor has to be displaced from its position shown in FIG. 1 to a new location on its spindle. Since channel 14 is located near one extremity of the UHF band, contactor 53 must be moved to one end of its spindle so that tuner control shaft 11 will be rotated to a position corresponding to channel 14. To select channel 14, the viewer rotates the control knob of the preset mechanism which action relocates contactor 53 in the following manner. As detailed in the aforementioned Polley patent, rotation of the present control knob effects a downward and rotational displacement of drive gear 62 urging that gear into engagement with spindle pinion 55. The rotation imparted to spindle 54 serves to displace contactor ball 53 along the axis of its spindle. Assume further that as contactor ball 53 departs from gap 49, it moves across conductors 45, to the right, as viewed in FIGS. 1 and 3. Conductor 44 is instantly disconnected from ground thus permitting application of the DC control signal from resistor 41 to gate 32 of triac 30 to render that triac conductive. Conductor 45, of course, remains grounded. In its conductive state triac 30 completes one energizing circuit between secondary 26 and the counterclockwise motor winding 24 and a second energizing circuit between the secondary and winding 25 through phase shift capacitor 29. In this arrangement, winding 24 controls the direction in which motor 19 rotates so that control shaft 11 and conductors 44, 45 are driven in a counterclockwise direction, as viewed in FIG. 2. Shaft 11 continues to rotate in that direction until conductor 44 engages contactor 53 which reconnects that conductor to ground and, thereby, deactivates triac 30. Since conductors 44, 45 are again grounded the motor is deenergized and rotation of shaft 11 is arrested.

On the other hand, if contactor ball 53 has been displaced to the left, instead of to the right, conductor 45 would have been ungrounded and triac 31 activated to energize winding 25 directly and winding 24 through the phase shift capacitor 29. Shaft 11 would then be driven in a clockwise direction until conductor 45 reengaged contactor 53 to deactivate triac 31 and terminate energization of the motor.

In practice, since the motor control circuit responds instantly each time the viewer adjusts the preset mechanism, contactor ball 53 is incrementally displaced along its spindle. In any event, for the case at hand, contactor 53 is driven toward the right until a transmission from channel 14 is observed on the screen of the receiver associated with tuner 15. The preset control is then released. Contactor 53 now occupies a position on its spindle which is directly related to the angular position occupied by shaft 11 in selecting channel 14; thereafter, whenever contactor 53 is transported to the index position of the turret, triac switch 30 will be activated to energize motor 19 and rotate shaft 11 to tune UHF tuner 15 to channel 14. This obtains because channel 14 is located at one end of the UHF band and therefore when contactor 53 is indexed, control shaft 11 must be driven toward the limit of its CCW range. The opposite, of course, holds true for channel 83 near the other extremity of the UHF band. That is, the tuner shaft will always be driven toward the limit of its CW range in order to receive channel 83.

Now it is obvious that each of contactor balls 53′ can be assigned a different UHF channel by simply rotating turret 60 to transport a particular one of contactors 53′ to the index position and then, by resort to preset mechanism 63, select a UHF channel for the indexed contactor by displacing the contactor ball along its spindle until the desired UHF channel is received. The position occupied by the contactor on its spindle is, of course, now directly related to the position assumed by shaft 11 for receiving the selected UHF channel. It should be noted, however, that when a contactor 53′ assigned to a channel other than 14 or 83, for example, channel 50 in the middle of the UHF band, either triac may be energized depending upon which of conductors 44 or 45 the contactor 53′ engages when it is indexed by the turret. For example, if tuner 15 was tuned to channel 14 and the viewer rotated the turret to select midband channel 50 then contactor 53′ would engage only conductor 44, on the right-hand side of gap 49, and maintain it at ground potential. Conductor 45 now being ungrounded permits application of control signal to the gate of triac 31 which, in turn, causes the CW winding to control rotation of motor 19. The motor remains energized driving tuner shaft 11 clockwise until conductor 45 engages contactor 53′. With contactor ball 53′ now spanning gap 49, both conductors are grounded and the motor is deenergized.

On the other hand, if tuner 15 was tuned to channel 83 and the viewer decided to select channel 50, then contactor 53′ would engage only conductor 45, on the left-hand side of gap 49, leaving conductor 44 ungrounded. Now the CCW winding would control rotation of the motor to drive tuner shaft 11 counterclockwise until contactor 53′ again spanned both of conductors 44, 45. Finally, it should be noted that the clockwise and counterclockwise directions applied to the motor, tuner shaft, etc., were assumed only for purposes of illustrating the operation of the drive system and are not to be construed as any kind of limitation on the system.

With an understanding of the manner in which conductors 44, 45 cooperate with grounded contact 53 in mind, attention is now directed to the factors that determine the dimensions and configuration of conductors 44, 45, as well as the slope of the gap 49 therebetween. In the following discussion, consideration will first be given to a conductor design for displacing a shaft over a range approaching, but less than, 360°. Thereafter the application of the design criteria to a 180°-shaft displacement will be readily comprehended.

An initial consideration, of course, concerns the axial travel distance desired, or available, for contactor 53 along its supporting spindle 54. While the degree of preset accuracy is, in part, proportional to the length of travel made available to contactor ball 53, as will be shown, the diameter of drum 48 is also determinative of preset accuracy. The dimensions of these two parameters, in turn, are dictated by the actual space available for the drive mechanism. This is particularly the case in a television receiver application. In any event, it is the available contactor travel that determines the width W′ of the working areas of the conductors 44′, 45′ illustrated in FIG. 4*a*. The length L′ of the working area of the conductors, on the other hand, is determined by the range of angular displacement to be accorded the control shaft. In the case immediately under consideration, i.e., a shaft displacement approaching 360°, the length L′ of the conductors 44′, 45′ would correspond to the circumference of the support drum 48′ for the conductors minus an increment to provide a nonconductive spacing S between the confronting W′ sides of the conductors, see FIG. 4*b*.

The next parameter for consideration is the slope of gap 49′. The slope, of course, is determined by the L′ to W′ ratio of conductors 44′, 45′. If the slope angle is defined as the angle included between the W side of a conductor and its tapered side, then the L/W ratio is the tangent of the slope angle. Now, insofar as the most efficient utilization of conductor working surface is concerned, this obtains when the L′ and W′ dimensions are equal thus establishing a slope of 45° for gap 49′. Since this conductor pair arrangement provides the smallest conductor surface areas, for a given travel assigned to contactor 53, it follows that it also constitutes the most efficient utilization of conductor material. Accordingly, as shown in FIG. 4*a*, the conductive working surfaces of a pair of conductors 44′, 45′ having substantially equal L′ and W′ dimensions conjointly approximate a square. When two such conductors are mounted upon a support drum, as shown in FIG. 4*b*, the range of control afforded shaft 11 is 360° minus the arcuate distance represented by S.

Referring now to FIGS. 4*c* and 4*d*, it will be shown that symmetrical conductor configurations other than a pair collectively defining a square, can be utilized although they do not provide the most efficient use of conductor material. For example, in FIG. 4*c* the angle of gap 49″ is 63°. The L″ dimension is twice W″ so that the tangent or slope of the gap angle is 2. Conductors 44″, 45″ therefore would require a drum 48″ having a diameter twice that required for conductors 44′, 45′.

It should be noted, however, that with elongated conductors 44″, 45″ a desired precision in preset accuracy is more easily attained than with conductors 44′, 45′. More particularly, the arcuate distance A″ along the circumference of drum 48″ embracing gap 49″, and corresponding to a predetermined position for shaft 11 is twice the arcuate distance A′ along the circumference of drum 48′ embracing its gap 49′, see FIG. *4d*. As a result, it is significantly easier to achieve registration of the contact ball 53 within arc A″ than in A′. So, other things being equal, i.e., gear backlash, tolerances, etc., it is much simpler to obtain repeat accuracy at predetermined shaft positions with elongated conductors requiring a large diameter mounting drum. Therefore, if space is available, elongating the conductors 44″, 45″ in their L dimension to increase the slope of the gap angle is one method of simplifying the attaining of preset accuracy.

An improvement in preset accuracy is also possible by reducing the slope of the gap. For example, the gap 49‴ separating conductors 44‴, 45‴ in FIG. *4e* is inclined at attributable 26°. The tangent or slope of this angle being ½, the W′ dimension of the conductors is now twice that of L‴. It is obvious that conductors 44‴, 45‴ require that the spindle for supporting contactor ball 53 be twice as long as that employed with conductors 44′, 45′.

The improvement in repeat accuracy resulting from the conductor arrangement of FIG. *4e* is attributable to the fact that the contactor-supporting spindle can have twice as many threads as a spindle employed with conductors 44′, 45′. As a result repeat accuracy is improved by a factor of two.

Figure 4:
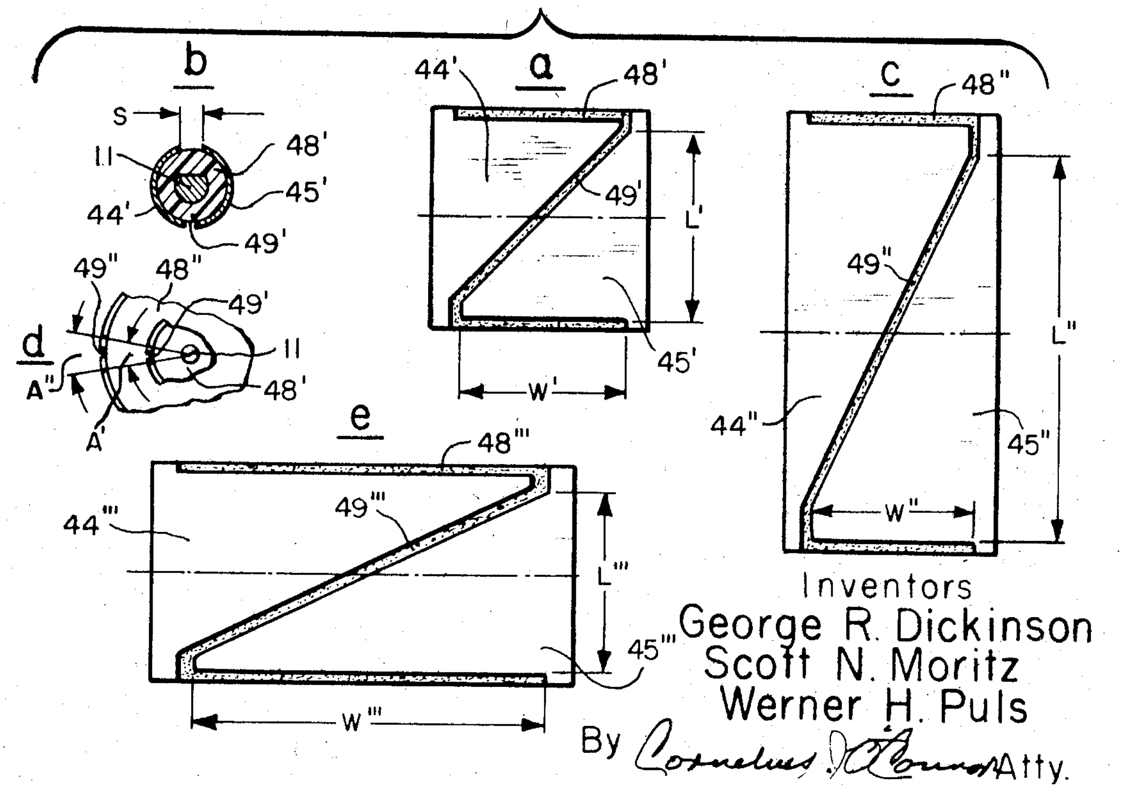
FIGS. 4*a*, 4*b*, 4*c*, 4*d* and 4*e* illustrate alternate arrangements for the conductor pair shown in FIGS. 1–3.

Now, applying the criteria developed during the discussion of FIG. 4 to the 180° shaft control arrangement of FIGS. 1–3 it should be clear that the same basic considerations, save one, apply. The excepted consideration, of course, concerns 180° shaft control is contrasted to 360°. This situation is readily resolved by simply selecting mounting drum structures for the FIG. 4 conductor pairs which have circumferences twice the L′, L″ or L‴ dimensions of the conductors. As a result the working surfaces of the conductors, that is, the portions flanking the gaps, extend for only 180° about the circumference of the mounting drum. This, substantially, is the manner in which conductors 44, 45 of FIGS. 1–3 cooperate with their mounting drum 48 to provide preset positioning of control shaft 11 over 180°.

A drive system employing the apparatus disclosed in FIGS. 1–3 has been constructed and found to give very satisfactory performance; by way of illustration, but in no sense by way of limitation, some of the components utilized in that drive system are:

| | |
|---|---|
| motor 19 | A. W. Haydon Co. Part No. 81301-P3 |
| triac 30 | RCA No. 40529 |
| triac 31 | RCA No. 40529 |
| resistor 34 | 1 KΩ |
| resistor 35 | 1 KΩ |
| 41 | 120 ohms |
| resistor 42 | 120 ohms |
| rectifier 37 | 1N4001 |
| resistor 38 | 1 KΩ |
| resistor 39 | 100 ohms |
| capacitor 40 | 125 μf. 4-volt |

The described apparatus comprises an effective and inexpensive preset drive mechanism for positioning a control shaft to a selected one of a plurality of predetermined locations. This drive arrangement avoids the shortcomings of the prior art in that overtravel of the control shaft 11 is prevented by virtue of the fact that motor energization is is instantly interrupted when the contactor ball spans gap 49. As a result hunting by the drive system about a desired shaft position is precluded.

While particular embodiments of the invention have been shown and described, modifications may be made, and it is intended in the appended claims to cover all such modifications as may fall within the true spirit and scope of the invention.

We claim:

1. A mechanism for displacing a control shaft to a predetermined position, said mechanism comprising:

a bidirectional electric motor coupled to said shaft and having first and second windings energizable for driving said motor in clockwise and counterclockwise directions, respectively;

a source of energization for said windings;

a pair of switches for independently connecting assigned ones of said windings directly to said energizing source;

and means including an actuator for selectively activating said switches, said actuator comprising a pair of spaced-apart conductive members supported for conjoint displacement with said shaft and individually connected to assigned ones of said switches and a contactor having a span greater than the spacing between said conductive members and locatable to a point related to said desired predetermined shaft position and supported in a confronting relation to said members and engageable with one of said conductive members when displaced from a standby position to an index position to activate one of said motor-energizing switches and thereby initiate displacement of said shaft and said conductive members toward said predetermined position, said activated switch thereafter being deactivated when both said conductive members simultaneously engage said contact upon arrival at said point related to said predetermined position.

2. A mechanism as set forth in claim 1 in which said pair of switches comprises normally nonconductive bidirectional, semiconductor devices each having a control electrode, and said means for selectively activating said switches comprise a source of control signal applied to said control electrodes by said spaced-apart conductive members.

3. A mechanism as set forth in claim 1 in which said conductive members have substantially identical conductive working surfaces.

4. A mechanism as set forth in claim 1 in which said conductive members are mounted upon and at least partially encircle said control shaft;

and in which said contactor comprises a partially spherical portion for spanning said spacing between said conductors and threaded upon a rotatable spindle for displacement along the axis of said spindle to a location related to said predetermined shaft position.

5. A mechanism as set forth in claim 4 in which said contactor further includes a planar portion disposed in abutting relation to a rotation-arresting member so that rotation of said spindle displaces said contactor along the axis of said spindle.

6. A mechanism as set forth in claim 5 further including means for rotating said spindle to incrementally displace said contactor to said point related to said desired predetermined shaft position.

* * * * *